US012570313B2

(12) United States Patent (10) Patent No.: US 12,570,313 B2
Kume et al. (45) Date of Patent: Mar. 10, 2026

(54) VEHICLE CONTROL DEVICE AND METHOD FOR CONTROLLING VEHICLE

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 261 days.

(21) Appl. No.: 18/457,248

(22) Filed: Aug. 28, 2023

(65) Prior Publication Data

US 2023/0399013 A1 Dec. 14, 2023

Related U.S. Application Data

(63) Continuation of application No. PCT/JP2022/004227, filed on Feb. 3, 2022.

(30) Foreign Application Priority Data

Mar. 3, 2021 (JP) ................................. 2021-033795
Oct. 21, 2021 (JP) ................................. 2021-172580

(51) Int. Cl.
*B60W 60/00* (2020.01)
*B60W 30/16* (2020.01)
*B60W 30/182* (2020.01)

(52) U.S. Cl.
CPC ........ *B60W 60/001* (2020.02); *B60W 30/162* (2013.01); *B60W 30/182* (2013.01);
(Continued)

(58) Field of Classification Search
CPC ............. B60W 60/001; B60W 30/162; B60W 30/182; B60W 2520/00; B60W 2540/043;
(Continued)

(56) References Cited

U.S. PATENT DOCUMENTS

| 11,498,563 B2 * | 11/2022 | Hirosawa | ........ B60W 30/18163 |
| 2012/0215428 A1 * | 8/2012 | Fujii | ........................ G01P 21/02 |
| | | | 701/30.3 |

(Continued)

FOREIGN PATENT DOCUMENTS

| JP | 2015112926 A | * | 6/2015 |
| JP | 2019084916 A | | 6/2019 |

(Continued)

*Primary Examiner* — Rachid Bendidi
*Assistant Examiner* — Nada Mahyoob Alqaderi
(74) *Attorney, Agent, or Firm* — Harness, Dickey & Pierce, P.L.C.

(57) ABSTRACT

A vehicle control device usable in a vehicle that is configured to switch an automatic driving level. The vehicle control device includes: a vehicle speed adjuster configured to adjust a speed of the vehicle at a set vehicle speed; and a suppressor configured to change an upper limit of acceleration of the vehicle according to a level of automatic driving of the vehicle. When the vehicle speed adjustment by the vehicle speed adjuster requires acceleration of the vehicle during a level 3 automatic driving, the suppressor lowers the upper limit of acceleration than the upper limit during a level 2 automatic driving.

17 Claims, 7 Drawing Sheets

(52) U.S. Cl.
CPC ... *B60W 2520/00* (2013.01); *B60W 2540/043* (2020.02); *B60W 2552/20* (2020.02); *B60W 2554/80* (2020.02)

(58) Field of Classification Search
CPC ......... B60W 2552/20; B60W 2554/80; B60W 2554/406; B60W 30/165; B60W 30/18163; B60W 2540/229; B60W 60/0013; B60W 2720/10; B60W 2720/106; B60W 30/143; G08G 1/16
See application file for complete search history.

(56) References Cited

U.S. PATENT DOCUMENTS

| | | | | |
|---|---|---|---|---|
| 2015/0239471 A1* | 8/2015 | Azuma | ................. | B60W 10/11 |
| | | | | 701/54 |
| 2019/0135302 A1* | 5/2019 | Kishi | ................. | B60W 10/184 |
| 2019/0286127 A1* | 9/2019 | Watanabe | ............ | G05D 1/0061 |
| 2020/0148205 A1* | 5/2020 | Yoshida | ............... | B60W 60/00 |
| 2020/0307640 A1* | 10/2020 | Tsuji | ................... | G05D 1/0268 |
| 2021/0108940 A1* | 4/2021 | Matsumoto | ........ | G01C 21/3667 |
| 2021/0276550 A1* | 9/2021 | Gotou | ..................... | G08G 1/16 |
| 2021/0380144 A1* | 12/2021 | Miki | ........................ | G08G 1/16 |

FOREIGN PATENT DOCUMENTS

| | | | | | |
|---|---|---|---|---|---|
| JP | 2019101453 A | | 6/2019 | | |
| JP | 2020069847 A | * | 5/2020 | | |
| JP | 2020121619 A | * | 8/2020 | | |
| JP | 2020152320 A | * | 9/2020 | ........ | B60W 60/0053 |
| WO | WO-2019043847 A1 | | 3/2019 | | |
| WO | WO-2020196053 A1 | * | 10/2020 | ........ | B60W 60/0053 |

* cited by examiner

VEHICLE CONTROL DEVICE AND METHOD FOR CONTROLLING VEHICLE

CROSS REFERENCE TO RELATED APPLICATION

The present application is a continuation application of International Patent Application No. PCT/JP2022/004227 filed on Feb. 3, 2022, which designated the U.S. and claims the benefit of priority from Japanese Patent Applications No. 2021-33795, filed on Mar. 3, 2021 and No. 2021-172580, filed on Oct. 21, 2021. The entire disclosures of all of the above applications are incorporated herein by reference.

TECHNICAL FIELD

The present disclosure relates to a vehicle control device and a method for controlling a vehicle.

BACKGROUND

Conventionally, autonomous driving operation of a vehicle has been investigated.

SUMMARY

According to an aspect of the present disclosure, a vehicle control device is usable for a vehicle that is configured to switch a level of automatic driving.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
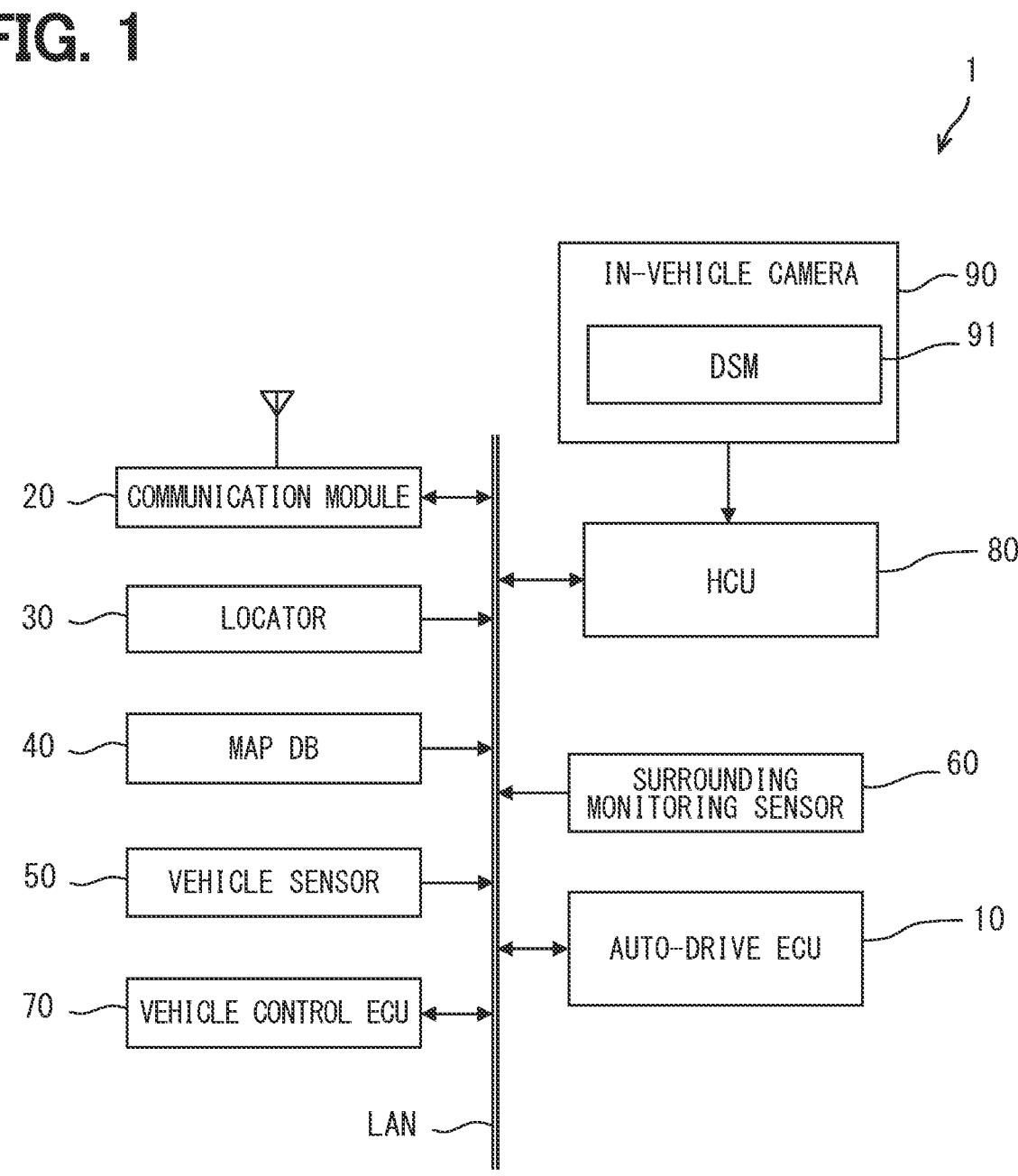
FIG. 1 is a diagram showing an example of a schematic configuration of a vehicle system.

Hereinafter, examples of the present disclosure will be described.

According to an example of the present disclosure, an automatic driving control unit has automatic driving functions from level 1 to level 5 in addition to a manual driving function in level 0. One example is configured to activate a preceding vehicle following function as an automatic driving function.

For example, the automation level classified into levels 0 to 5 defined by SAE are known. Level 0 is a level where the driver performs all driving tasks without any intervention of the system. Level 0 corresponds to so-called manual driving. Level 1 is a level where the system assists steering or acceleration and deceleration. Level 2 is a level where the system assists steering and acceleration and deceleration. The automatic driving in levels 1 and 2 is automatic driving in which a driver has a duty of monitoring related to safe driving (hereinafter simply referred to as a monitoring duty). Level 3 is a level where the system is capable of performing all driving tasks in a certain location, such as a highway, and the driver performs driving in an emergency. Level 4 is a level where the system is capable of performing all driving tasks, except under a specific circumstance, such as an unsupported road, an extreme environment, and the like. Level 5 is a level in which the system is capable of performing all driving tasks in any situation. Automatic driving in level 3 or higher is automatic driving in which the driver is free from a monitoring duty.

In the automatic driving with an automation level of Level 3 or higher, the driver may be not watching the surroundings because the driver has no monitoring duty. In such a situation where the driver does not watch the surroundings, there is a possibility that an occupant of the vehicle may feel uneasy if the degree of acceleration is high when the follow-up control to follow the preceding vehicle is performed.

According to an example of the present disclosure, a vehicle control device is usable for a vehicle. The vehicle is configured to switch a level of automatic driving. The vehicle control device comprises: a vehicle speed adjuster configured to adjust a speed of the vehicle at a set vehicle speed; and a suppressor configured to change an upper limit of acceleration of the vehicle according to the level of automatic driving of the vehicle, when the vehicle speed adjuster requires acceleration of the vehicle to adjust the speed of the vehicle.

According to an example of the present disclosure, a method is for controlling a vehicle. The vehicle is configured to switch a level of automatic driving. The method is executable by at least one processor. The method comprises: adjusting, in a vehicle speed adjustment process, a speed of the vehicle at a set vehicle speed; and changing, in a suppression process, an upper limit of acceleration of the vehicle according to the level of automatic driving of the vehicle, when the vehicle speed adjustment process requires acceleration of the vehicle to adjust the speed of the vehicle.

According to the above configuration and method, even when the vehicle is required to accelerate in order to adjust the vehicle speed to the set vehicle speed, the upper limit of acceleration of the vehicle is changeable according to the level of automatic driving of the vehicle. Therefore, even if the susceptibility of occupants to feeling uneasy about acceleration differs depending on the level of automatic driving, it is possible to change the upper limit of acceleration according to the level of automatic driving so that the occupants are less likely to feel uneasy. As a result, it is possible to suppress the uneasiness of the occupant while accelerating the vehicle by the automatic driving function.

Multiple embodiments is described for disclosure hereinafter with reference to the drawings. For convenience of description, among multiple embodiments, a configuration having the same function as a configuration shown in the drawing and described in the previous embodiment may be indicated by the same reference symbol, and the description thereof may be omitted. Description in another applicable embodiment may be referred to for such a portion denoted by the identical reference sign.

First Embodiment

<Schematic Configuration of Vehicle System 1>

The following describes the first embodiment of the present disclosure with reference to the accompanying drawings. A vehicle system 1 shown in FIG. 1 can be used in a vehicle capable of performing automatic driving (hereinafter referred to as an automatic driving vehicle). As shown in FIG. 1, the vehicle system 1 includes an auto-drive ECU 10, a communication module 20, a locator 30, a map database (hereinafter referred to as map DB) 40, a vehicle sensor 50, a surrounding monitoring sensor 60, a vehicle control ECU 70, a HCU (Human Machine Interface Control Unit) 80, and an in-vehicle camera 90. For example, the auto-drive ECU 10, the communication module 20, the locator 30, the map DB 40, the vehicle sensor 50, the surrounding monitoring sensor 60, the vehicle control ECU 70, and the HCU 80 may be configured to be connected to an in-vehicle LAN (see LAN in FIG. 1). Although the vehicle using the vehicle system 1 is not necessarily limited to an automobile, hereinafter, an example of application to the automobile is described.

The level of the automatic driving (hereinafter, referred to as an automation level) of an automatic driving vehicle includes multiple levels as defined by, for example, SAE. The automation level is divided into, for example, LV0 to LV5 as follows.

LV0 is a level where the driver performs all driving tasks without any intervention of the system. The driving task may be rephrased as a dynamic driving task. The driving tasks include, for example, steering, acceleration and deceleration, and surrounding monitoring. LV0 corresponds to so-called manual driving. LV1 is a level where the system assists steering or acceleration and deceleration. LV1 corresponds to so-called driving assistance. LV2 is a level where the system assists steering and acceleration and deceleration. LV2 corresponds to so-called partial driving automation. It is assumed that LV1 and LV2 are also part of automatic driving.

For example, the automatic driving in LV1 and LV2 is automatic driving in which a driver has a duty of monitoring related to safe driving (hereinafter simply referred to as a monitoring duty). In other words, it corresponds to automatic driving with monitoring duty. The monitoring duty includes visual monitoring of surroundings. LV1 or LV2 automatic driving is, in other words, automatic driving in which a second task is not permitted. The second task is an action other than a driving operation permitted to the driver, and is a predetermined specific action. The second task is, in other words, a secondary activity, an other activity, or the like. The second task must not prevent a driver from responding to a request to take over the driving operation from the automatic driving system. As an example, viewing of a content such as a video, operation of a smartphone, reading a book, eating and the like are assumed as the second task.

LV3 automatic driving is a level in which the system is capable of performing all driving tasks under specific conditions, and the driver performs driving operations in an emergency. LV3 automatic driving requires the driver to be able to respond quickly when the system requests a change of driving. This take over of the driving can also be rephrased as transfer/delegation/devolution of the monitoring duty of the surroundings from the system (i.e., vehicle system side) to the driver (i.e., driver side). LV3 corresponds to so-called conditional driving automation. As LV3, there is an area-limited LV3 that is limited to a specific area. The specific area referred to here may be a motorway or expressway. The specific area may also be, for example, a specific lane of a road. As LV3, there is also a congestion-limited LV3 that is limited to traffic congestion. The congestion-limited LV3 may be configured to be limited to traffic congestions on motorways and expressways, for example.

LV4 automatic driving is a level in which the system can perform all driving tasks, except under specific conditions such as unsupportable roads and extreme environments. LV4 corresponds to so-called advanced driving automation. LV5 automatic driving is a level in which the system can perform all driving tasks under all circumstances. LV5 corresponds to so-called complete driving automation.

For example, LV3 to LV5 automatic driving is automatic driving in which the driver has no monitoring duty. In other words, it corresponds to automatic driving without monitoring duty. LV3 to LV5 automatic driving is, in other words, automatic driving in which a second task is permitted. Among levels 3 to 5 of automatic driving, automatic driving in level 4 or higher corresponds to automatic driving in which the driver is permitted to sleep. Among levels 3 to 5 of automatic driving, level 3 automatic driving corresponds to automatic driving in which the driver is not permitted to sleep.

The automatic driving vehicle of the present embodiment is configured to switch the automation level. A configuration may be employable in which the automation level is switchable within a part of the LV0 to LV5. In the present embodiment, an example is described in which an automatic driving vehicle can switch between automatic driving in LV3, automatic driving in LV2 or lower, and manual driving in LV0.

The communication module 20 transmits and receives information to and from a center outside a subject vehicle via wireless communication. That is, wide area communication is performed. The communication module 20 receives information such as traffic congestion around the subject vehicle from the center through wide area communication. The communication module 20 may transmit and receive information to and from other vehicles via wireless communication. In other words, vehicle-to-vehicle communication may be performed. The communication module 20 may transmit and receive information via wireless communication with a roadside device installed on a roadside. In other words, the communication module 20 may perform road-to-vehicle communication. When performing the road-to-vehicle communication, the communication module 20 may receive information of a surrounding vehicle transmitted from the surrounding vehicle via the roadside device. In addition, the communication module 20 may receive information of surrounding vehicles transmitted from surrounding vehicles of the subject vehicle by wide area communication via the center.

The locator 30 includes a GNSS (Global Navigation Satellite System) receiver and an inertia sensor. The GNSS receiver receives positioning signals from multiple positioning satellites. The inertia sensor includes, for example, a gyro sensor and an acceleration sensor. The locator 30 combines the positioning signals received by the GNSS receiver with a measurement result of the inertia sensor to sequentially detect a position of the subject vehicle (hereinafter, subject vehicle position) on which the locator 30 is mounted. The subject vehicle position may be represented by, for example, coordinates of latitude and longitude. The subject vehicle position may be measured by using a travel distance obtained from signals sequentially output from a vehicle speed sensor mounted on the vehicle.

The map DB 40 is a non-volatile memory, and stores the high-precision map data. The high-precision map data is map data with higher precision than the map data used for route guidance in a navigation function. The map DB 40 may also store map data used for route guidance. The high-precision map data includes information usable for the automatic driving, such as three-dimensional road shape information, information on the number of lanes, information indicating the direction of travel allowed for each of the lanes and the like. In addition, the high-precision map data may also include a node point information indicating positions of both ends of a road marking such as a lane marking and the like. Note that the locator 30 may be configured without the GNSS receiver by using the three-dimensional shape information of the road. For example, the locator 30 may be configured to identify the subject vehicle position by using the three-dimensional shape information of the road and a detection result of the surrounding monitoring sensor 60 such as a LiDAR (Light Detection and Ranging/Laser Imaging Detection and Ranging) that detects feature points of the road shape and the structure, a surrounding monitoring camera or the like. The three-dimensional shape information of the road may be generated based on a captured image by REM (Road Experience Management).

The communication module 20 may receive map data distributed from an external server through, for example, wide area communication and may store the data in the map DB 40. In such case, the map DB 40 may be a volatile memory, and the communication module 20 may sequentially acquire the map data of an area corresponding to the subject vehicle position.

The vehicle sensor 50 is a sensor group for detecting various states of the subject vehicle. The vehicle sensor 50 includes a vehicle speed sensor for detecting a vehicle speed, a steering sensor for detecting a steering angle, and the like. As the vehicle sensor 50, there is a winker switch for detecting lighting operation of a winker lamp, which is a direction indicator. As the vehicle sensor 50, there is a seat sensor that detects whether or not an occupant is seated on a seat. The vehicle sensor 50 outputs detected sensing information to the in-vehicle LAN. Note that the sensing information detected by the vehicle sensor 50 may be output to the in-vehicle LAN via the ECU mounted on the subject vehicle HV.

The surrounding monitoring sensor 60 monitors a surrounding environment of the subject vehicle. For example, the surrounding monitoring sensor 60 detects an obstacle around the subject vehicle, such as a pedestrian, a moving object like an other vehicle, and a stationary object, an object on the road and the like. The surrounding monitoring sensor 60 further detects a road surface marking such as a traffic lane marking around the subject vehicle. The surrounding monitoring sensor 60 is a sensor such as a surrounding monitoring camera that captures a predetermined range around the subject vehicle, a millimeter wave radar that transmits a search wave in a predetermined range around the subject vehicle, a sonar, a LiDAR or the like. The surrounding monitoring camera sequentially outputs, as the sensing information, sequentially-captured images to the auto-drive ECU 80. A sensor that transmits a probe wave such as a sonar, a millimeter wave radar, a LiDAR or the like sequentially outputs, as the sensing information to the auto-drive ECU 80, a scanning result based on a received signal obtained as a wave reflected on an obstacle on the road. The sensing information detected by the surrounding monitoring sensor 60 may be configured to be output to the auto-drive ECU 10 without going through the in-vehicle LAN.

The vehicle control ECU 70 is an electronic control device configured to perform a travel control of the subject vehicle. The travel control includes an acceleration and deceleration control and/or a steering control. The vehicle control ECU 70 includes a steering ECU that performs the steering control, a power unit control ECU and a brake ECU that perform the acceleration and deceleration control, and the like. The vehicle control ECU 70 is configured to output a control signal to a travel control device such as an electronic throttle, a brake actuator, an EPS (Electric Power Steering) motor mounted on the subject vehicle and the like, thereby to perform the travel control.

The HCU 80 is mainly composed of a computer having a processor, a volatile memory, a nonvolatile memory, an I/O, and a bus connecting these. The HCU 10 execute various processes related to communication between the occupant and the system of the vehicle, by executing a control program stored in a non-volatile memory to.

The in-vehicle camera 90 captures an image of a predetermined range in the occupant compartment of the subject vehicle. In the present embodiment, the in-vehicle camera 90 includes a DSM (Driver Status Monitor) 91 that monitors the driver of the vehicle. The DSM 91 is configured by a near-infrared light source and a near-infrared camera together with a control unit for controlling these elements and the like. The DSM 91 is provided to an upper surface of an instrument panel, for example, with the near-infrared camera oriented toward the driver's seat of the subject vehicle. The DSM 91 uses the near-infrared camera to capture the driver to which the near-infrared light is emitted from the near-infrared light source. The imaging range may be set to include at least the driver's head. An image captured by the near-infrared camera is subjected to image analysis by the control unit. The control unit detects the driver's arousal level, facial orientation, loss of posture, etc., based on the driver's feature amount extracted by image analysis of the captured image. For detection of the arousal level, at least an arousal state and a sleeping state should be distinguished and detected. If a camera other than the DSM 91 is used as the in-vehicle camera 90, the occupant(s) other than the driver (hereinafter referred to as a co-occupant) may be photographed by, for example, a near-infrared camera. Then, in the same manner as the DSM 91, the occupant's arousal level, face orientation, loss of posture, etc. may be detected.

The auto-drive ECU 10 is mainly composed of a computer having a processor, a volatile memory, a nonvolatile memory, I/O, and a bus connecting these. The auto-drive ECU 10 executes processes related to automatic driving by executing a control program stored in the nonvolatile memory. This auto-drive ECU 10 corresponds to a vehicle control device. The configuration of the auto-drive ECU 10 is described below in detail.

<Schematic Configuration of Auto-drive ECU 10>

Figure 2:
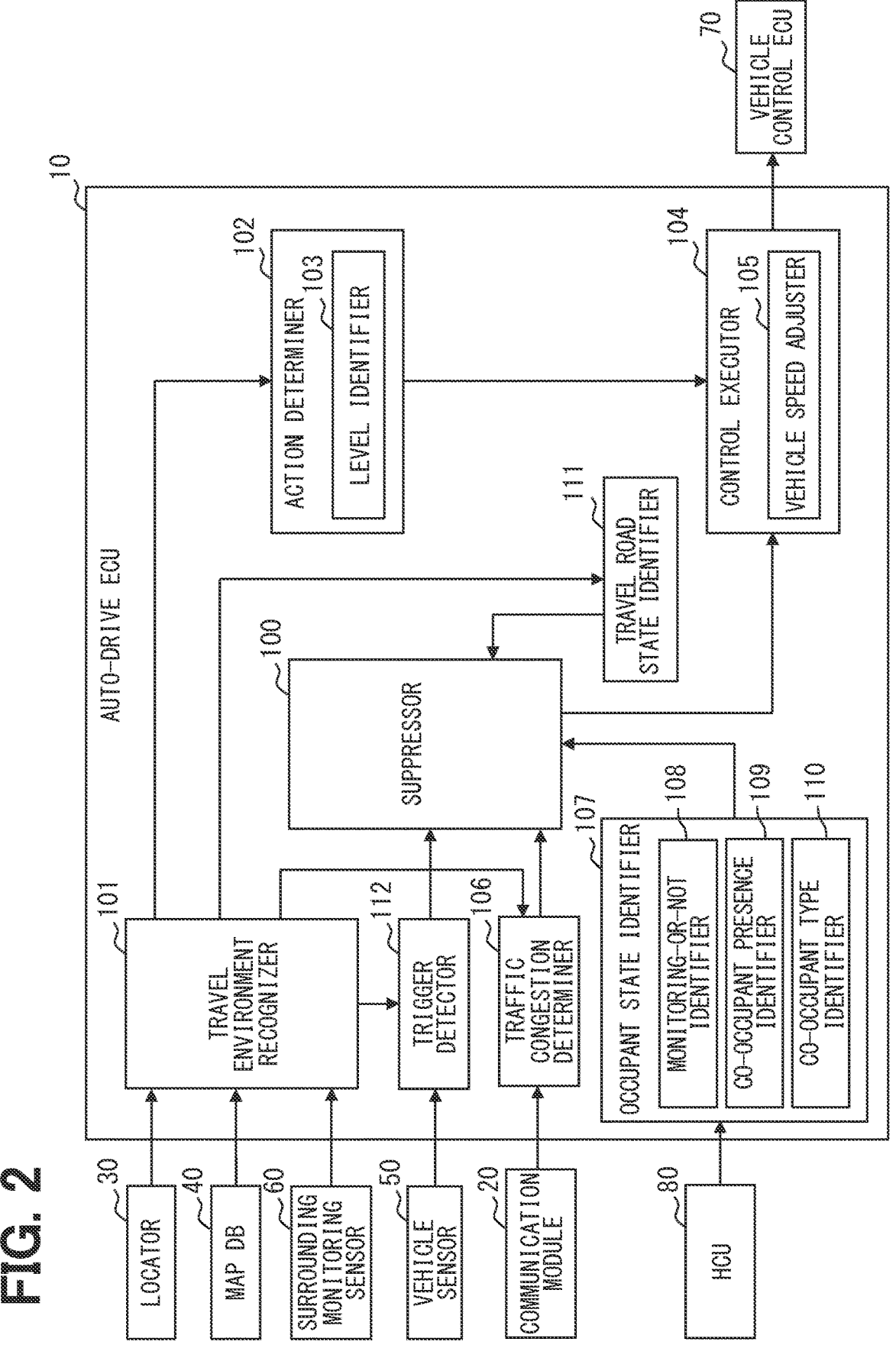
FIG. 2 is a diagram showing an example of a schematic configuration of an auto-drive ECU.

Next, a schematic configuration of the auto-drive ECU 10 is described with reference to FIG. 2. As shown in FIG. 2, the auto-drive ECU 10 includes a suppressor 100, a travel environment recognizer 101, an action determiner 102, a control executor 104, a traffic congestion determiner 106, an occupant state identifier 107, a travel road state identifier 111, and a trigger detector 112 respectively as a functional block. Execution of the process of each functional block of the auto-drive ECU 10 by the computer corresponds to execution of the vehicle control method. Note that a part of or an entire functional block executed by the auto-drive ECU 10 may be configured as hardware circuit using one or more integrated chips or the like. Alternatively, a part of or an entire functional block executed by the auto-drive ECU 10 may be realized as a combination of (i) execution of software by a processor and (ii) a hardware member.

The travel environment recognizer 101 recognizes a travel environment around the subject vehicle based on the sensing information obtained from the surrounding monitoring sensor 60. As an example, the travel environment recognizer 101 recognizes a detailed position of the subject vehicle in a travel lane (hereinafter, subject vehicle lane) from information such as left and right lane markings of the travel lane in which the subject vehicle travels and the like. In addition, the travel environment recognizer 101 recognizes a position and a speed of an obstacle such as another vehicle around the subject vehicle and the like. The travel environment recognizer 101 recognizes the position and the speed of an obstacle such as another vehicle and the like in the subject vehicle lane. Further, the travel environment recognizer 101 recognizes the position and speed of an obstacle such as another vehicle in a nearby lane of the subject vehicle lane. The nearby lane may be, for example, a lane adjacent to the subject vehicle lane. Alternatively, the nearby lane may be a lane other than the subject vehicle lane in a road section where the subject vehicle is located.

In addition to the sensing information obtained from the surrounding monitoring sensor 60, based on the subject vehicle position obtained from the locator the map data obtained from the map DB 40, the information of other vehicles obtained by the communication module 20, and the like, the travel environment recognizer 101 may recognize the travel environment around the subject vehicle. As an example, the travel environment recognizer uses these pieces of information to generate a virtual space that reproduces an actual travel environment.

Further, the travel environment recognizer 101 may also determine a manual travel area (hereinafter referred to as an MD area) in a travel region of the subject vehicle. The travel environment recognizer 101 may also determine an automatic driving area (hereinafter referred to as an AD area) in the travel region of the subject vehicle. The travel environment recognizing unit 101 may also determine an ST section and a non-ST section, which is described later, in the AD area.

The MD area is an area where the automatic driving is prohibited. In other words, the MD area is established as a predetermine area where the driver performs all of a longitudinal direction control, a lateral direction control and a surrounding monitoring of the subject vehicle. A longitudinal direction is a direction that coincides with a front-rear direction of the subject vehicle. A lateral direction is a direction that coincides with a right-left direction of the subject vehicle. The longitudinal direction control corresponds to acceleration/deceleration control of the subject vehicle. The lateral direction control corresponds to a steering control of the subject vehicle. For example, the MD area may be established as an ordinary road.

The AD area is an area where the automatic driving is permitted. In other words, the AD area is established as an area where a system in the subject vehicle is permitted to substitute the driver for performing one or more of the longitudinal direction control, the lateral direction control, and the surrounding monitoring. For example, the AD area may be established as a highway or a motorway. The congestion-limited, LV3 automatic driving (hereinafter referred to as congestion-limited automatic driving) may be configured, for example, to be permitted only during a congestion in the AD area.

The AD area is divided into an ST section and a non-ST section. The ST section is a section in which area-limited LV3 automatic driving (hereinafter referred to as area-limited automatic driving) is permitted. The area-limited automatic driving may be configured to be permitted only in a specific lane or lanes in the ST section. The non-ST section is a section in which automatic driving in LV2 or lower is possible. In the present embodiment, the non-ST section in which LV1 automatic driving is permitted and the non-ST section in which LV2 automatic driving is permitted are not divided. The ST section may be, for example, a travel section in which a high-precision map date is prepared. The non-ST section may be a section that does not correspond to the ST section in the AD area.

The action determiner 102 switches the control subject of driving operation between the driver and the system of the subject vehicle. The action determiner 102 determines a travel plan for a travel of the subject vehicle based on the recognition result of the travel environment by the travel environment recognizer 101 when the system has a control right of the driving operation. As a travel plan, it is sufficient to determine a behavior that the subject vehicle should take in order to reach a destination. The action determiner 102 has a level identifier 103 as a sub-functional block. The level identifier 103 identifies a current automation level of the subject vehicle. The level identifier 103 may establish a distinction between the area-limited LV3 and the congestion-limited LV3 and identify each. The area-limited LV3 and the congestion-limited LV3 are subdivided levels of the automation LV3.

The control executor 104 performs acceleration/deceleration control and steering control of the subject vehicle according to the travel plan determined by the action determiner 102 in cooperation with the vehicle control ECU 70 when the system has the control right of the driving operation. The control executor 104 has a vehicle speed adjuster 105 as a sub-functional block. The vehicle speed adjuster 105 adjusts the speed of the subject vehicle to achieve the set vehicle speed. The process in the vehicle speed adjuster 105 corresponds to a step of vehicle speed adjustment. As the set vehicle speed, the vehicle speed determined by the travel plan may be set. The vehicle speed adjuster 105 executes an acceleration/deceleration control of the control executor 104. In the travel plan, the vehicle speed may be determined according to a setting input by the user, or the vehicle speed may be determined according to a speed limit of the travel road, or the vehicle speed may be determined according to the automation level. The control executor 104 executes, for example, ACC (Adaptive Cruise Control) control, LTA (Lane Tracing Assist) control, and LCA (Lane Change Assist) control.

The ACC control is a control for realizing (i) a constant speed travel of the subject vehicle at a set vehicle speed or (ii) a following travel to a preceding vehicle. In the following travel, acceleration/deceleration control is performed to maintain an inter-vehicle distance between the subject vehicle and an immediate preceding vehicle as a target inter-vehicle distance. The target inter-vehicle distance may be set according to the speed of the subject vehicle or the like. The vehicle speed adjuster 105 executes acceleration/deceleration control during the following travel. The LTA control is a control for maintaining an in-lane travel of the subject vehicle. In the LTA control, steering control is performed to keep the travel of the subject vehicle within a certain lane. The LCA control is a control for the subject vehicle to change lanes, i.e., from a current lane to an adjacent lane. In the LCA control, when the trigger detector 112 (to be described later) detects a trigger for performing a lane change (hereinafter referred to as a lane change trigger), the lane is changed by performing acceleration/deceleration control and steering control. The vehicle speed adjuster 105 also performs acceleration/deceleration control when changing lanes.

The control executor 104 realizes automatic driving in LV2 or higher by performing both of the ACC control and the LTA control. The LCA control may be made performable, for example, when the ACC control and the LTA control are performed. The control executor 104 may realize LV1 automatic driving by performing either the ACC control or the LTA control.

According to the configuration described above, automatic driving in LV2 or lower and LV3 or higher is performable in the subject vehicle. Further, the auto-drive ECU 10 switches the automation level of the automatic driving of the subject vehicle as required. As an example, the manual driving may be switched to the automatic driving in LV2 or lower, when the subject vehicle moves from the MD area to the non-ST section in the AD area. When the subject vehicle moves from the MD area to the ST section in the AD area, the manual driving may be switched to the LV3 automatic driving. When the subject vehicle moves from the non-ST section to the ST section in the AD area, the automatic driving in LV2 or lower should be switched to the LV3 automatic driving. When the subject vehicle moves from the ST section to the non-ST section in the AD area, the LV3 automatic driving should be switched to the automatic driving in LV2 or lower. When the subject vehicle moves from the ST section in the AD area to the MD area, the LV3 automatic driving may be switched to the manual driving. When the subject vehicle moves from the non-ST section in the AD area to the MD area, the automatic driving in LV2 or lower may be switched to the manual driving.

The traffic congestion determiner 106 determines whether or not a congestion continues. The traffic congestion determiner 106 may determine whether or not the congestion continues during the congestion-limited automatic driving. Whether or not the congestion continues may be determined based on a congestion section identifiable from congestion information obtained by the communication module 20. Whether or not the congestion continues may be determined based on whether or not the subject vehicle position is outside the congestion section. Alternatively, whether or not the congestion continues may be determined based on whether or not a distance from the subject vehicle position to an area in front of the vehicle and outside the congestion section is less than a threshold value. The threshold value here is a value greater than 0 and may be arbitrarily set.

The occupant state identifier 107 identifies a state of the occupant of the subject vehicle. The occupant state identifier 107 corresponds to a state identifier. The occupant state identifier 107 includes a monitoring-or-not identifier 108, a co-occupant presence identifier 109, and a co-occupant type identifier 110 as sub-functional blocks.

The monitoring-or-not identifier 108 identifies whether or not the driver of the subject vehicle is monitoring the surroundings. Based on the detection result of the DSM 91, the monitoring-or-not identifier 108 may identify whether or not the driver of the subject vehicle is monitoring the surroundings. For example, if the detection result of the DSM 91 indicates that the driver is in the arousal state, in a state that the face is facing forward, and in a state that the posture is not lost, the monitoring-or-not identifier 108 may identify that the driver is monitoring the surroundings. On the other hand, if the detection result of the DSM 91 is in any of the sleeping state, the state that the face not facing forward, or the state that the posture is lost, the monitoring-or-not identifier 108 may determine that the driver is not monitoring the surroundings.

The co-occupant presence identifier 109 identifies the presence or absence of a co-occupant in the subject vehicle. The co-occupant presence identifier 109 may identify the presence or absence of a co-occupant in the subject vehicle based on the detection result of the in-vehicle camera 90. For example, the co-occupant presence identifier 109 may identify the presence/absence of a co-occupant in the subject vehicle based on whether or not a person other than the driver's seat could be recognized from an image captured by the in-vehicle camera 90. Alternatively, the co-occupant presence identifier 109 may identify the presence or absence of a co-occupant in the subject vehicle based on whether or not a seat sensor of the vehicle sensor 50 detects that an occupant is seated in a seat other than the driver's seat.

The co-occupant type identifier 110 identifies a type of the co-occupant of the subject vehicle. The co-occupant type identifier 110 may identify the type of the co-occupant of the subject vehicle based on the detection result of the in-vehicle camera 90. For example, the co-occupant type identifier 110 may estimate the co-occupant type from the image of the co-occupant captured by the in-vehicle camera 90. As for the type of co-occupant, it is sufficient to distinguish whether or not the occupant is a person of protection target or not. Examples of a person of protection target include children and elderly. A person of protection target may be recognized by, for example, pattern recognition. Pregnant women and the like may also be included in a category of the protection target in addition to the children and the elderly, if they are distinguishable.

The travel road state identifier 111 identifies a state of the road on which the vehicle is traveling. The travel road state identifier 111 also corresponds to a state identifier. The travel road state identifier 111 identifies a state of the road on which the vehicle is traveling based on the travel environment recognized by the travel environment recognizer 101. The state of the road on which the vehicle is traveling, which is identified by the travel road state identifier 111, may be, for example, whether the road is a curved road or a straight road. Alternatively, the state of the road to be identified may also be the presence or absence of ice. The presence or absence of ice may be estimated based on an outside air temperature sensor. The state of the road to be identified may also be whether the road is wet or not. Whether the road is wet or not may be estimated from the brightness of the captured image of a road surface.

The trigger detector 112 detects a lane change trigger that triggers a lane change of the subject vehicle. The lane change trigger may be a detection of a situation in which a lane change is required. Alternatively, the lane change trigger may be a combination of (i) a detection of a situation in which a lane change is required and (ii) a driver's approval thereof. An example of a situation in which a lane change is required is a situation in which (i) a speed of a preceding vehicle immediately ahead of the subject vehicle is equal to or lower than a predetermined value and (ii) there is no vehicle approaching toward an area including a side and a rear side of the subject vehicle. Another example is a situation where the number of lanes is reduced and a lane change becomes necessary. Yet another example may be a situation in which a lane change is required to go into a dedicated left or right turn lane, for a navigation a desired route. These situations may be identified from the travel environment recognized by the travel environment recognizer 101 and the like. An example of approval by the driver may be a turn-on operation of a winker lamp. The turn-on operation of the winker lamp may be detected by a winker switch in the vehicle sensor 50.

The suppressor 100 changes an upper limit of acceleration of the subject vehicle according to the automation level of the subject vehicle when the speed adjustment of the subject vehicle by the vehicle speed adjuster 105 requires acceleration of the subject vehicle. The process in the suppressor 100 corresponds to a step of suppression. The automation level corresponds to the level of automatic driving. In the automation level mentioned here, the area-limited LV3 and the congestion-limited LV3 may be distinguished as different levels of automatic driving. Various means can be used as a means for the suppressor 100 to change the upper limit of acceleration. For example, an upper limit value for acceleration may be set. Alternatively, an upper limit value for an engine rotation number may be set. If the travel power source is a motor, an upper limit value for the number of revolutions of the motor may be set. Note that the means for changing the upper limit of acceleration is not limited to the above examples. Other means may be used as long as the means can change the upper limit of acceleration. In the following, an example is described in which the upper limit of acceleration is changed by changing the setting of the upper limit value of acceleration.

The suppressor 100 makes the upper limit of acceleration of the subject vehicle lower during automatic driving in LV3 or higher than during automatic driving in LV2 or lower. The suppressor 100 lowers the upper limit of acceleration of the subject vehicle than the upper limit, when the speed adjustment of the subject vehicle by the vehicle speed adjuster 105 requires acceleration of the subject vehicle, during automatic driving in LV2 or lower. Assuming that the upper limit value of acceleration during automatic driving in LV2 or lower is Th1, and the upper limit value of acceleration during automatic driving in LV3 or higher is Th2, the suppressor 100 may set the upper limit value Th2 of acceleration to satisfy a relationship Th2<Th1. During automatic driving in LV3 or higher, unlike automatic driving in LV2 or lower, there is no duty to monitor the surroundings, the driver may possibly be not watching the surroundings. Even in such a situation that the driver is not watching the surroundings, the upper limit of acceleration is lowered, thereby it is possible to suppress sudden acceleration.

When the monitoring-or-not identifier 108 identifies that the driver of the subject vehicle is monitoring the surroundings during automatic driving in LV3 or higher, the suppressor 100 may preferably set the upper limit of acceleration of the subject vehicle to (i) the same value as automatic driving in LV2 or lower or (ii) a value higher than the one during automatic driving in LV2 or lower. The suppressor 100 may preferably set the upper limit of acceleration of the subject vehicle to (i) the same value as automatic driving in LV2 or lower, or (ii) a value higher than the one during automatic driving in LV2 or lower, even when the speed adjustment of the subject vehicle by the vehicle speed adjuster 105 requires acceleration of the subject vehicle during automatic driving in LV3 or higher, in case that the monitoring-or-not identifier 108 identifies that the driver of the subject vehicle is monitoring the surroundings. The suppressor 100 may set the upper limit value Th2 of the acceleration to satisfy a relationship of Th2 Th1. Even during automatic driving in LV3 or higher, where there is no duty to monitor the surroundings, if the driver is monitoring the surroundings, the driver is less likely to feel uneasy even if the vehicle suddenly accelerates. Therefore, in such a situation, the upper limit of acceleration is lowered to enable rapid changes in vehicle speed.

When the trigger detector 112 detects a lane change trigger even during automatic driving in LV3 or higher, the suppressor 100 may preferably set the upper limit of acceleration of the subject vehicle to (i) the same value as automatic driving in LV2 or lower, or (ii) a value higher than the one during automatic driving in LV2 or lower. The suppressor 100 may preferably set the upper limit of acceleration of the subject vehicle to (i) the same value as automatic driving in LV2 or lower, or (ii) a value higher than the one during automatic driving in LV2 or lower, when the speed adjustment of the subject vehicle by the vehicle speed adjuster 105 requires acceleration of the subject vehicle, in case that the trigger detector 112 detects a lane change trigger even during automatic driving in LV3 or higher. The suppressor 100 may set the upper limit value Th2 of the acceleration to satisfy a relationship of Th2 Th1. The suppressor 100 may set Th2 to the maximum value that is settable as the upper limit value. According to the above, even during automatic driving in LV3 or higher, where there is no duty to monitor the surroundings, sudden acceleration is enabled when changing lanes that requires the sudden acceleration.

It may be preferable that the suppressor 100 lowers the upper limit of acceleration of the subject vehicle during the congestion-limited automatic driving than the one during the area-limited automatic driving. The suppressor 100 may preferably lower the upper limit of acceleration than the upper limit during area-limited automatic driving, when the speed adjustment of the subject vehicle by the vehicle speed adjuster 105 requires acceleration of the subject vehicle during congestion-limited automatic driving, because of a sudden increase of the inter-vehicle distance to the preceding vehicle due to a lane change of the preceding vehicle to an adjacent lane. Assuming that an upper limit value of acceleration during area-limited automatic driving is Th2a and an upper limit value of acceleration during congestion-limited automatic driving is Th2j, the suppressor 100 may set the upper limit value Th2j of acceleration to satisfy a relationship Th2j<Th2a. Th2a and Th2j are included in the upper limit value Th2 of acceleration during automatic driving in LV3 or higher. During congestion-limited automatic driving, where the travel speed is likely to be lower than that of area-limited automatic driving, the driver may be more prone to uneasiness about rapid acceleration. In view of the above, since acceleration is suppressed than area-limited automatic driving, the driver is less likely to feel uneasy.

The suppressor 100 may preferably maintain the travel at constant speed, i.e., without acceleration, when the traffic congestion determiner 106 determines that the traffic congestion continues during congestion-limited automatic driving. The suppressor 100 may preferably maintain the travel of the subject vehicle at constant speed, i.e., without acceleration, even when the speed adjustment of the subject vehicle by the vehicle speed adjuster 105 requires acceleration of the subject vehicle because of a sudden increase of the inter-vehicle distance to the preceding vehicle due to a lane change of the preceding vehicle to an adjacent lane, in case that the traffic congestion determiner 106 determines that the traffic congestion continues during congestion-limited automatic driving. When the inter-vehicle distance in front of the subject vehicle increases during the traffic congestion, the inter-vehicle distance decreases without acceleration of the subject vehicle if the traffic congestion continues. Therefore, in such a situation, unnecessary acceleration is suppressed by maintaining constant speed travel without acceleration.

It should be noted that, when the traffic congestion determiner 106 determines that the traffic congestion does not continue during congestion-limited automatic driving, the suppressor 100 may preferably lower the upper limit of acceleration of the subject vehicle than area-limited automatic driving. In other words, the suppressor 100 preferably set a lower upper limit of acceleration for ((((the speed adjustment of))) the subject vehicle than area-limited automatic driving, when the speed adjustment of the subject vehicle by the vehicle speed adjuster 105 requires acceleration of the subject vehicle because of a sudden increase of the inter-vehicle distance to the preceding vehicle due to a lane change of the preceding vehicle to an adjacent lane, in case that the traffic congestion determiner 106 determines that the traffic congestion is not continuing during congestion-limited automatic driving. In such case, the upper limit of acceleration may be set to a value higher than zero. That is, the upper limit value Th2j of acceleration may be set to satisfy a relationship 0<Th2j<Th2a.

It may be preferable that the suppressor 100 increases the upper limit of acceleration of the subject vehicle during area-limited automatic driving than during congestion-limited automatic driving. The suppressor 100 may preferably increase the upper limit of acceleration of the subject vehicle than the upper limit thereof during congestion-limited automatic driving, when the speed adjustment of the subject vehicle by the vehicle speed adjuster 105 requires acceleration of the subject vehicle because of a sudden increase of the inter-vehicle distance to the preceding vehicle due to a lane change of the preceding vehicle to an adjacent lane, during area-limited automatic driving. The suppressor 100 may set the upper limit value Th2a of acceleration to satisfy a relationship Th2j<Th2a. During area-limited automatic driving, where the travel speed is likely to be higher than congestion-limited automatic driving, it is considered that there may be greater number of situations/occasions where acceleration is required than during congestion-limited automatic driving. In view of the above, rapid acceleration than congestion-limited automatic driving is enabled while suppressing sudden acceleration.

The suppressor 100 may preferably change the upper limit of acceleration of the subject vehicle according not only to the level of automatic driving of the subject vehicle but also to the state identified by the occupant state identifier 107 and/or the travel road state identifier 111. The suppressor 100 may preferably change the upper limit of acceleration of the subject vehicle according not only to the level of automatic driving of the subject vehicle, but also to the state identified by the occupant state identifier 107 and/or the state identified by the travel road state identifier 111, when the speed adjustment of the subject vehicle by the vehicle speed adjuster 105 requires acceleration of the subject vehicle. Rapid acceleration may be not desirable depending on the state of the occupant and the state of the road. In such case, it becomes possible to further suppress the acceleration. Specific examples are described below.

For example, if the state of the occupant of the subject vehicle identified by the occupant state identifier 107 is a poor physical state or a state of concentrating on a work using vision other than monitoring the surroundings (hereinafter referred to as a specific state), it is preferable for the suppressor 100 to lower the upper limit of acceleration of the subject vehicle than in the case of not being in the specific state. For example, the suppressor 100 may lower the upper limit of acceleration by, for example, multiplying the upper limit of acceleration by a predetermined first coefficient smaller than 1. The first coefficient may be an arbitrarily settable value greater than zero.

Poor physical state may be identifiable from the fact that the in-vehicle camera 90 and the DSM 91 have detected that the occupant loses his/her posture. A state in which the occupant is concentrating on a work using vision other than monitoring the surroundings is a state in which the occupant is looking at, for example, a book, an in-vehicle display screen, or characters or images on the screen of a mobile terminal. Such a state can also be rephrased as a state of performing the second task in which the occupant is looking at characters or images. Such a state of the occupant may be identified by pattern recognition of images captured by the in-vehicle camera 90 and the DSM 91, or the like. Note that the target occupant may be limited to the driver among the occupants, or may be all occupants including the driver. When an occupant is in the specific state, the occupant's awareness is not directed to the surroundings of the subject vehicle, and therefore it is considered that the occupant is more likely to feel uneasy about rapid acceleration. In consideration of the above, when the occupant is in the specific state, acceleration is suppressed than when the occupant is not in the specific state, thereby putting the occupant to be in a state in which he/she is less susceptible to a feel of uneasiness.

For example, the suppressor 100 may preferably change the upper limit of acceleration of the subject vehicle according to the presence or absence of a co-occupant identified by the co-occupant presence identifier 109. When the co-occupant presence identifier 109 identifies that there is a co-occupant, the suppressor 100 may lower the upper limit of acceleration of the subject vehicle compared to when the co-occupant presence identifier 109 identifies that there is no co-occupant. For example, the upper limit of acceleration may be lowered by, for example, multiplying the upper limit of acceleration by a predetermined second coefficient smaller than 1. The second coefficient may be an arbitrarily settable value greater than zero. Since it is highly likely that a co-occupant or co-occupants are less conscious of their surroundings than the driver, they are more likely to feel uneasy about rapid acceleration. In view of such a consideration, when there is a co-occupant in the subject vehicle, the acceleration is suppressed than when there is no co-occupant in the subject vehicle, thereby allowing the co-occupant to less likely feel uneasy.

Further, when (a) the co-occupant presence identifier 109 identifies that there is a co-occupant in the co-occupant presence identifier 109, and (b) the co-occupant type identifier 110 identifies that the co-occupant is a person of protection target, the suppressor 100 may set a lower upper limit of acceleration than when the co-occupant type identifier 110 identifies that the co-occupant is not a person of protection target. For example, the upper limit of acceleration may be lowered by, for example, multiplying the upper limit of acceleration by a predetermined third coefficient smaller than 1. The third coefficient may be settable to any arbitrary value greater than 0. It is considered that a person of protection target is more likely to feel uneasy about rapid acceleration than a person not set as a protection target. In consideration of the above, when a person of protection target exists, the acceleration is suppressed than when the person of protection target does not exist, thereby allowing the person of protection target to less likely feel uneasy.

For example, the suppressor 100 may preferably change the upper limit of acceleration of the subject vehicle according to a state of the road on which the subject vehicle is traveling, which is identified by the travel road state identifier 111. As an example, the suppressor 100 preferably sets a lower upper limit of acceleration of the subject vehicle when the state of the road on which the vehicle is traveling, which is identified by the travel road state identifier 111, is a curved road, compared to when the road is a straight road. For example, the upper limit of acceleration may be lowered by, for example, multiplying the upper limit of acceleration by a predetermined fourth coefficient smaller than 1. The fourth coefficient may be an arbitrarily settable value greater than zero. Since a centrifugal force is generated by acceleration on a curved road, it is considered that a driver and an occupant are more likely to feel uneasy about rapid acceleration than on a straight road. In view of such a consideration, when traveling on a curved road, the acceleration is suppressed than when traveling on a straight road, thereby allowing the occupant to less likely feel uneasy.

Note that the suppressor 100 may be configured to lower the upper limit of acceleration of the subject vehicle as a curvature of the curved road increases. The greater the curvature of the curved road is, the greater the centrifugal force generated by the acceleration becomes. In view of such a situation, the greater the curvature of the curved road is, the acceleration is suppressed more, thereby allowing the occupant to less likely feel uneasy. It is preferable that the suppressor 100 lowers the upper limit of acceleration of the subject vehicle when the road is in a state where rapid acceleration is not desirable, other than on a curved road. Examples of road states where rapid acceleration is undesirable include icy roads, wet roads, and the like. In addition, the suppressor 100 may lower the upper limit of acceleration by an amount that satisfies a plurality of states for lowering the upper limit of acceleration.

<Acceleration Upper Limit Related Process in the Auto-Drive ECU 10>

Figure 3:
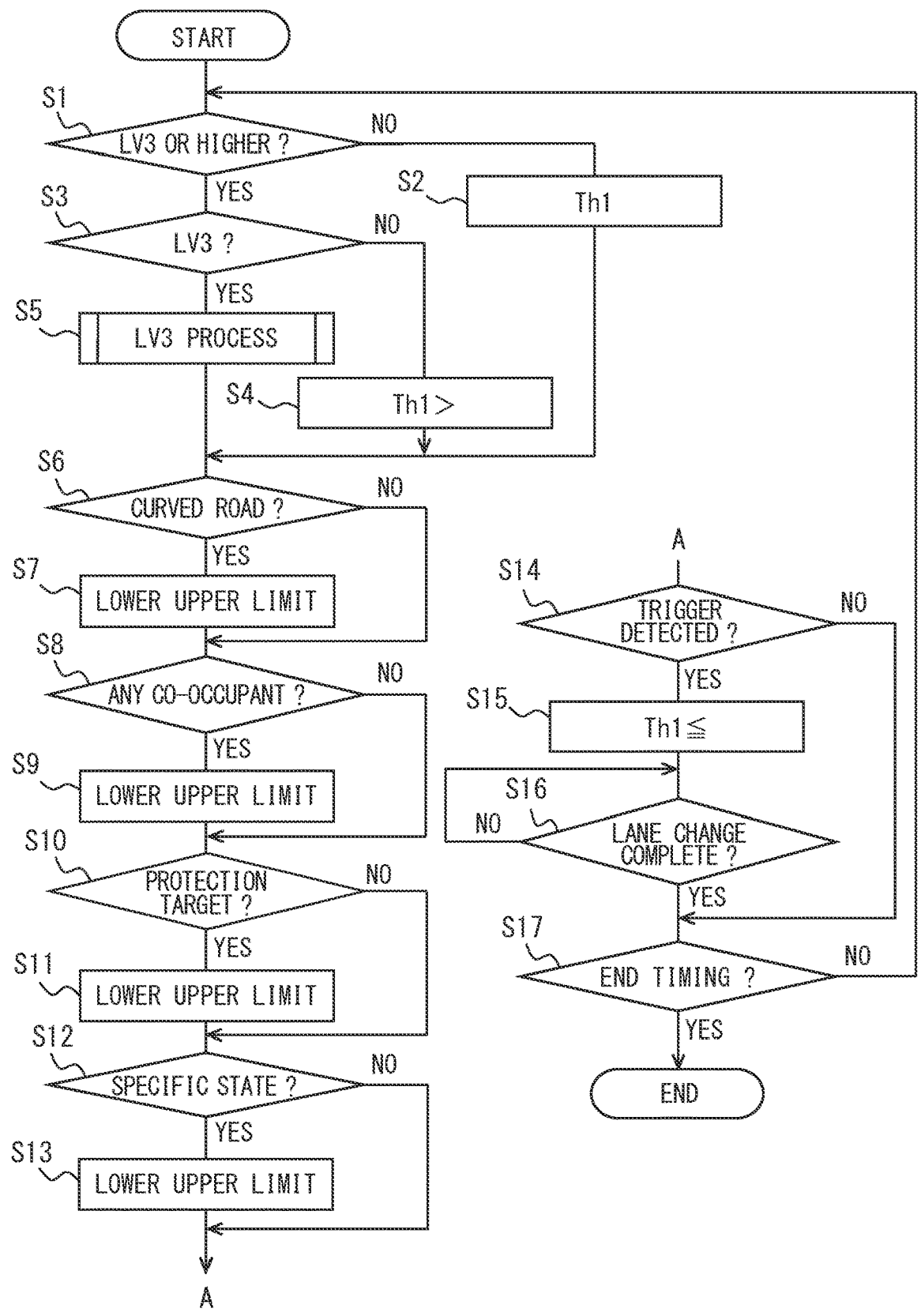
FIG. 3 is a flowchart showing an example of a flow of an acceleration upper limit related process in the auto-drive ECU according to a first embodiment.
Figure 4:
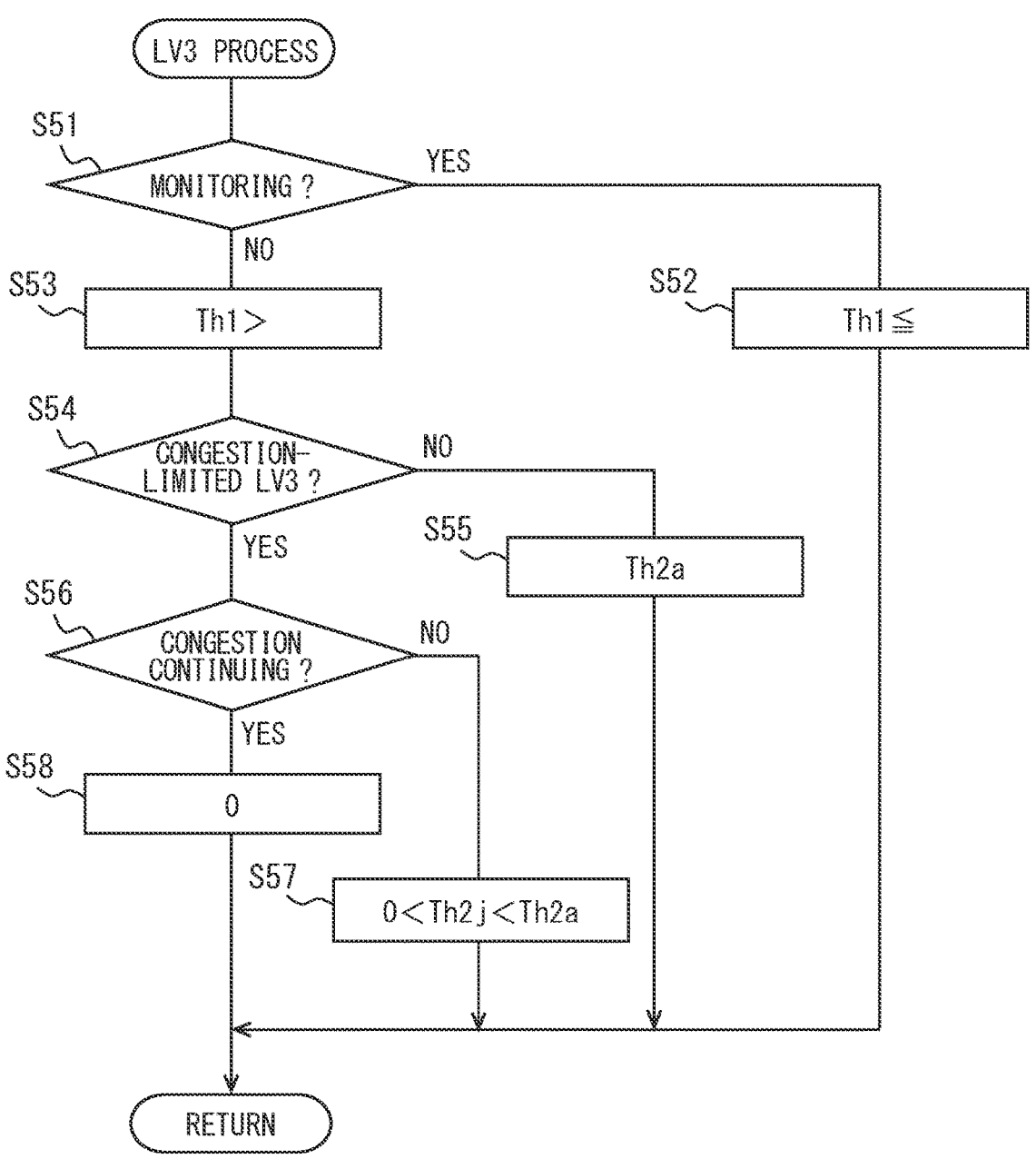
FIG. 4 is a flowchart showing an example of a flow of an LV3 process in the auto-drive ECU according to the first embodiment.

Here, an example of the flow of a process related to changes in an upper limit of acceleration (hereinafter referred to as an acceleration upper limit related process) in the auto-drive ECU 10 is described using flowcharts of FIGS. 3 and 4. The flowchart of FIG. 3 may be configured to be started when, for example, a switch (hereinafter referred to as a power switch) for starting an internal combustion engine or a motor-generator of the subject vehicle is turned on. As described above, in the present embodiment, a case where an upper limit of acceleration is changed by changing a setting of the upper limit of acceleration is described as an example.

First, in step S1, when the automation level of the subject vehicle identified by the level identifier 103 is LV3 or higher (YES in S1), the process proceeds to step S3. On the other hand, if it is LV2 or lower (NO in S1), the process proceeds to step S2. In step S2, the suppressor 100 sets an upper limit value Th1 of acceleration, and the process proceeds to step S6. Note that, in S2, the suppressor 100 may set a lower upper limit of acceleration in the automation levels 1 and 2 than in the automation level Other than the above, in S2, the upper limit of acceleration may be lowered as the automation level rises.

In step S3, when the automation level of the subject vehicle identified by the level identifier 103 is LV3 (YES in S3), the process proceeds to step S5. On the other hand, if the level is LV4 or higher (NO in S3), the process proceeds to step S4. In step S4, the suppressor 100 sets the upper limit of acceleration to be smaller than Th1, and the process proceeds to step S6. In S4, for example, an upper limit value Th2 of acceleration that satisfies Th2<Th1 may be set. Note that, when applying to a vehicle not having an automatic driving function of LV4 or higher, the process of S3 to S4 may be omitted, and YES in S3 may be configured to proceed to S5.

In step S5, an LV3 process is performed, and the process proceeds to step S6. Here, an example of the flow of the LV3 process is described with reference to a flowchart of FIG. 4.

First, in step S51, when the monitoring-or-not identifier 108 identifies that the driver of the subject vehicle is monitoring the surroundings (YES in S51), the process proceeds to step S52. On the other hand, if it is identified that the surroundings are not monitored by the driver of the subject vehicle (NO in S51), the process proceeds to step S53.

In step S52, the suppressor 100 sets the upper limit value of acceleration to Th1 or greater, and proceeds to step S6. In S52, the upper limit value of acceleration may be set to Th1, or may be set to a value greater than Th1. It may also be possible to adopt a configuration in which the process proceeds to step S12 after the process of S52. On the other hand, in step S53, the suppressor 100 sets the upper limit value of the acceleration to be smaller than Th1, and the process proceeds to step S54. In S53, for example, an upper limit value Th2 of acceleration that satisfies Th2<Th1 may be set.

In step S54, if the automation level of the subject vehicle identified by the level identifier 103 is the congestion-limited LV3 (YES in S54), the process proceeds to step S56. On the other hand, if it is the area-limited LV3 (NO in S54), the process proceeds to step S55.

In step S55, the suppressor 100 sets the upper limit value Th2a as the upper limit value Th2 of the acceleration, and the process proceeds to step S6. In S55, an upper limit value Th2a of acceleration that satisfies, for example, Th2a>Th2j may be set.

In step S56, if the traffic congestion determiner 106 determines that the traffic congestion continues (YES in S56), the process proceeds to step S58. On the other hand, if it is determined that the congestion is not continuing (NO in S56), the process proceeds to step S57.

In step S57, the suppressor 100 sets, as the upper limit value Th2 of acceleration, the upper limit value Th2j, and the process proceeds to step S6. In S57, the upper limit value Th2j of acceleration may be set as a value that satisfies, for example, 0<Th2j<Th2a. On the other hand, in step S58, the suppressor 100 sets the upper limit value of acceleration to 0, and the process proceeds to step S6. When the upper limit of acceleration is set to 0, the vehicle is maintained at a constant speed without being accelerated.

Returning to FIG. 3, in step S6, if the state of the road on which the subject vehicle is traveling identified by the travel road state identifier 111 is a curved road (YES in S6), the process proceeds to step S7. On the other hand, if the identified state of the road on which the subject vehicle is traveling is a straight road (NO in S6), the process proceeds to step S8. In step S7, the suppressor 100 sets the upper limit value of the acceleration to a value lower than a currently-set value.

In step S8, if the co-occupant presence identifier 109 identifies that there is a co-occupant (YES in S8), the process proceeds to step S9. On the other hand, if it is identified that there is no co-occupant (NO in S8), the process proceeds to step S10. In step S9, the suppressor 100 sets the upper limit value of the acceleration to a value lower than a currently-set value.

In step S10, when the co-occupant is identified as a person of protection target by the co-occupant type identifier 110 (YES in S10), the process proceeds to step S11. If there are a plurality of co-occupants, and even one of them is identified as a person of protection target, the process may proceed to step S11. On the other hand, if it is determined that the co-occupant is not a person of protection target (NO in S10), the process proceeds to step S12. If there are a plurality of co-occupants, the process may proceed to step S12 when none of the co-occupants is identified as a person of protection target. In step S11, the suppressor 100 sets the upper limit of acceleration to a value lower than a currently-set value.

In step S12, if the state of the occupant of the subject vehicle identified by the occupant state identifier 107 is the aforementioned specific state (YES in S12), the process proceeds to step S13. On the other hand, if it is not in the specific state (NO in S12), the process proceeds to step S14. In step S13, the suppressor 100 sets the upper limit of acceleration to a value lower than a currently-set value.

In step S14, when the trigger detector 112 detects a lane change trigger (YES in S14), the process proceeds to step S15. On the other hand, when the lane change trigger is not detected (NO in S14), the process proceeds to step S17. In step S15, the suppressor 100 sets the upper limit value of acceleration to Th1 or greater, and the process proceeds to step S16. In S15, the upper limit value of acceleration may be set to Th1, or may be set to a value greater than Th1. In step S16, when the lane change of the subject vehicle is complete (YES in S16), the process proceeds to step S17. On the other hand, when the lane change has not been complete (NO in S16), the process of S16 is repeated.

In step S17, if it is an end timing of the acceleration upper limit related process (YES in S17), the acceleration upper limit related process is terminated. On the other hand, if it is not the end timing of the acceleration upper limit related process (NO in S17), the process returns to S1, and repeats the process. One example of the end timing of the acceleration upper limit related process is a timing when the power switch is turned off.

Summary of the First Embodiment

According to the configuration of the first embodiment, even when the subject vehicle is required to accelerate in order to adjust the speed of the subject vehicle to the set vehicle speed, the upper limit of acceleration of the subject vehicle is changeable according to the automation level of the subject vehicle. Therefore, even when feel of uneasiness of the occupant about acceleration differs depending on the automation levels, the upper limit of acceleration is changeable according to the automation level to prevent the occupant from feeling uneasiness. As a result, it is possible to suppress the uneasiness of the occupant while accelerating the vehicle by the automatic driving function.

Further, the configuration described in the first embodiment is merely an example, and may be configured to omit part of the conditions for changing the upper limit of acceleration. In such case, the functional blocks related to the omitted conditions may also be omitted from the auto-drive ECU 10.

Second Embodiment

In the first embodiment, when there is a co-occupant, the upper limit of acceleration is lowered even when the co-occupant is not a person of protection target, but this is not necessarily the case. For example, even if there is a co-occupant, if the co-occupant is not a person of protection target, the upper limit of acceleration may be not lowered compared to the case where there is no co-occupant (hereinafter, the second embodiment). The following describes a detailed example of the second embodiment with reference to the accompanying drawings.

The vehicle system 1 of the second embodiment is the same as the vehicle system 1 of the first embodiment, except that part of the process in the suppressor 100 is different. The differences in the process are described below.

In the second embodiment, even if the co-occupant presence identifier 109 identifies that there is a co-occupant, in case that the co-occupant type identifier 110 identifies that the co-occupant is not a person of protection target, the suppressor 100 does not lower the upper limit of acceleration compared to the case where there is no occupant identified. In other words, the upper limit of acceleration should be kept unchanged when it is identified that there is no co-occupant.

Figure 5:
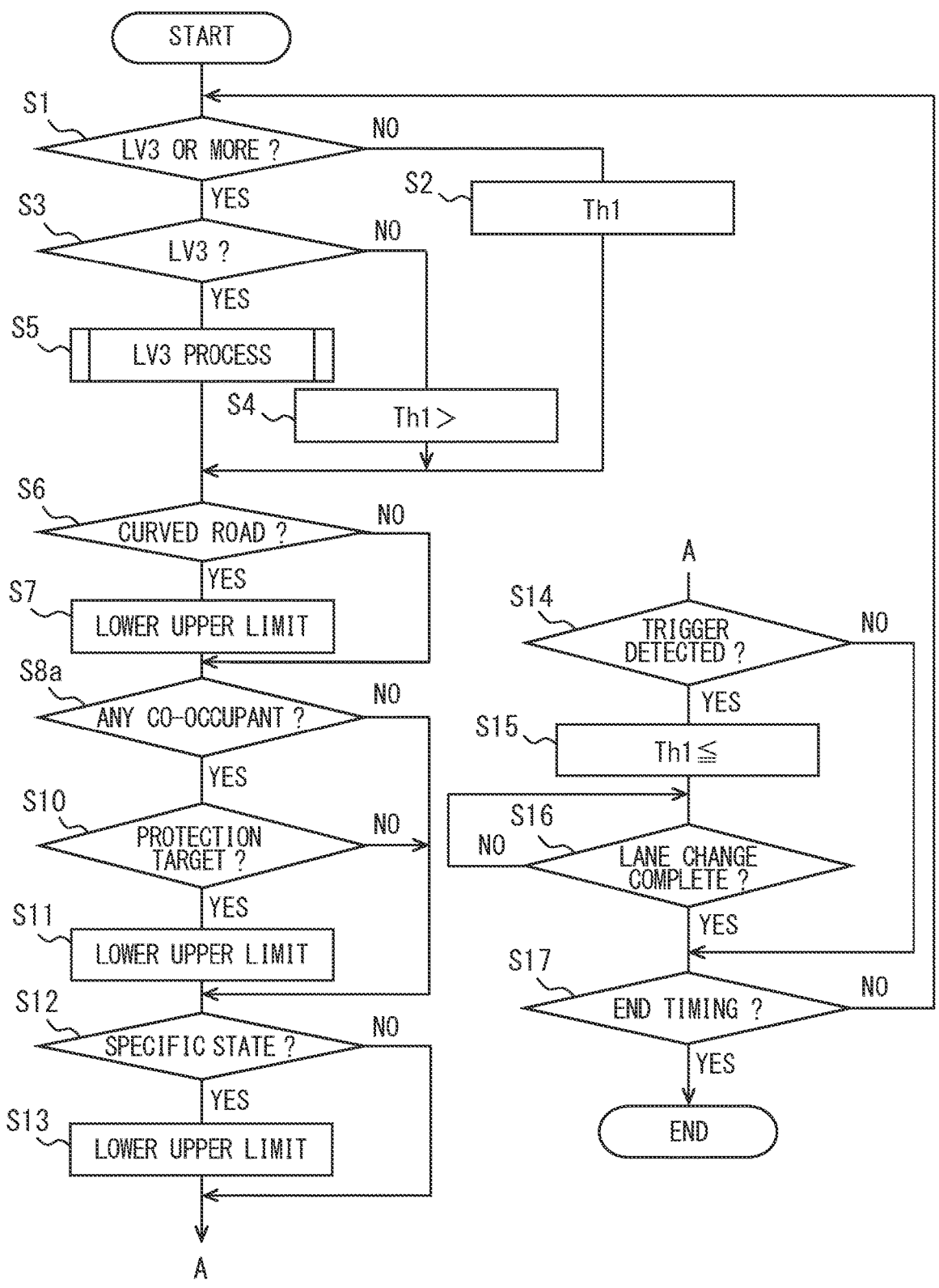
FIG. 5 is a flowchart showing an example of a flow of acceleration upper limit related process in the auto-drive ECU according to a second embodiment.

Here, an example of the flow of the acceleration upper limit related process in the auto-drive ECU 10 according to the second embodiment is described using a flowchart of FIG. 5. The process of S1 to S7 is the same as in the first embodiment. In step S8a, if the co-occupant presence identifier 109 identifies that there is a co-occupant (YES in S8a), the process proceeds to S10. On the other hand, if it is identified that there is no co-occupant (NO in S8a), the process proceeds to S12. The process of S10 to S17 is the same as in the first embodiment.

Third Embodiment

The configuration of the third embodiment described in the following may also be applicable. The following describes a detailed example of the third embodiment with reference to the accompanying drawings.

The vehicle system 1 according to the third embodiment is the same as the vehicle system 1 according to the first embodiment, except that part of the LV 3 process in the suppressor 100 is different. The differences in the process are described below.

In the third embodiment, the suppressor 100 temporarily stops, during congestion-limited automatic driving, the acceleration of the subject vehicle, even when acceleration of the subject vehicle is required in the adjustment of vehicle speed of the subject vehicle by the vehicle speed adjuster 105 because the inter-vehicle distance to the preceding vehicle suddenly increases due to a lane change of the preceding vehicle to an adjacent lane (hereinafter mentioned as a specific acceleration situation). For example, the action determiner 102 may determine that the specific acceleration situation occurs. The term "temporarily" as used herein may be defined as a length of time that can be arbitrarily set. For example, "temporarily" may be equal to or longer than the length of time which is estimated as required for the preceding vehicle to complete the lane change. Stop of the acceleration of the subject vehicle may be realized, for example, by setting the upper limit of acceleration to 0 and causing the vehicle to travel at a constant speed.

During congestion-limited automatic driving, the distance between the subject vehicle and the immediately preceding vehicle is small, thereby the inter-vehicle distance ahead of the subject vehicle may suddenly widen when the immediately preceding vehicle changes lanes. However, if the subject vehicle is accelerated at such timing, sudden braking of the subject vehicle may become necessary when the preceding vehicle stops changing lanes and returns to the original lane. Sudden braking of the subject vehicle may cause uneasiness to the occupant, especially during automatic driving without monitoring duty. On the other hand, according to the configuration of the third embodiment, the acceleration of the subject vehicle temporarily stops even when the specific acceleration situation occurs, thereby, even in a situation in which the preceding vehicle immediately ahead of the subject vehicle stops changing lanes to return to the original lane, the subject vehicle does not have to perform sudden braking. On the other hand, when the vehicle immediately ahead of the subject vehicle has completed the lane change, the subject vehicle can be accelerated after releasing the temporary stop of acceleration of the subject vehicle. Therefore, it is possible to suppress the uneasiness of the occupants while accelerating the vehicle by the automatic driving function.

Figure 6:
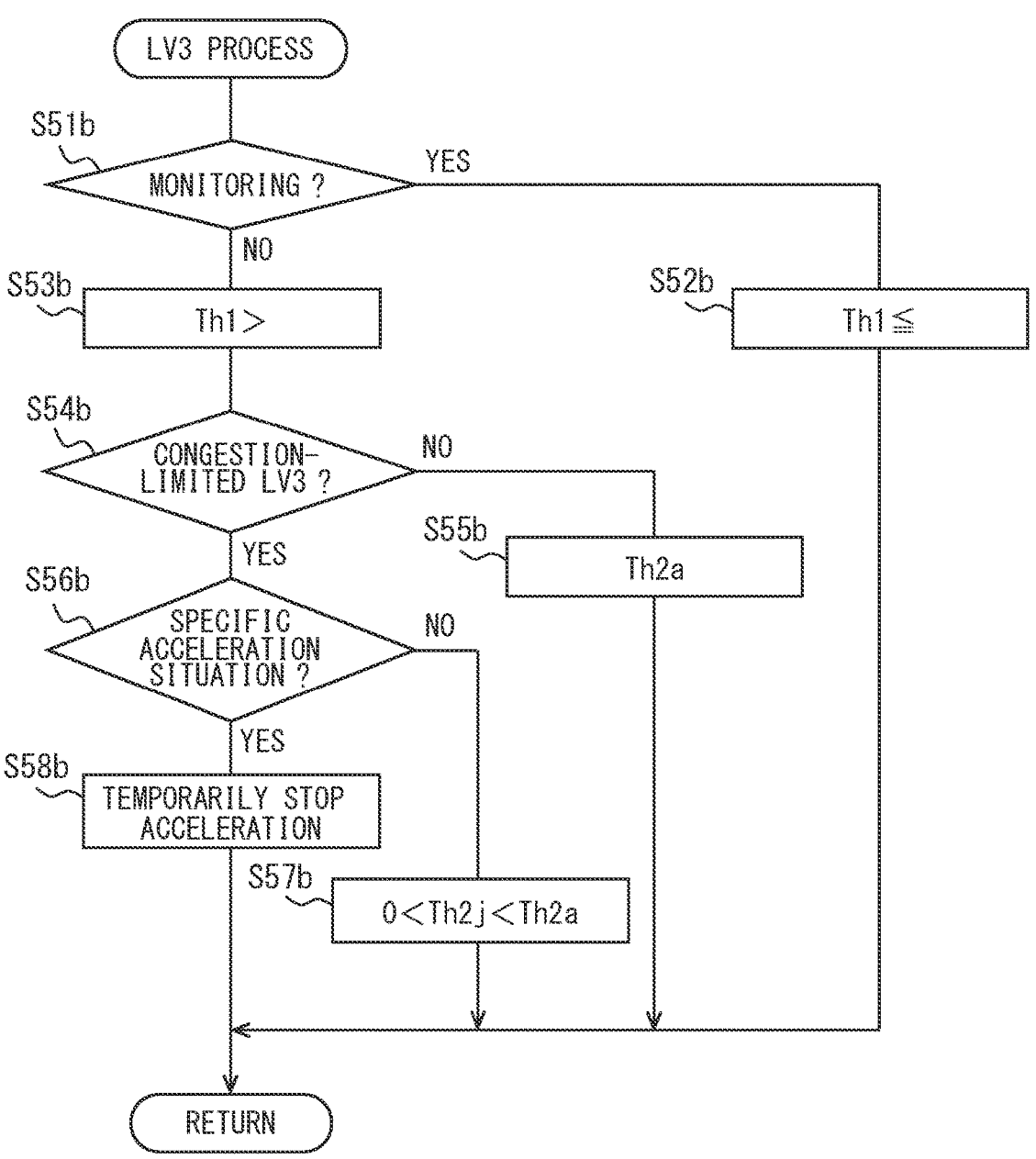
FIG. 6 is a flowchart showing an example of a flow of the LV3 process in the auto-drive ECU according to a third embodiment.

Here, an example of the flow of LV3 process in the auto-drive ECU 10 according to the third embodiment is described using a flowchart of FIG. 6. The process of S51*b* to S55*b* is the same as the process of S51 to S55 of the first embodiment. In S54*b*, if the automation level of the subject vehicle identified by the level identifier 103 is congestion-limited LV3 (YES in S54*b*), the process proceeds to step S56*b*. On the other hand, if it is area-limited LV3 (NO in S54*b*), the process proceeds to step S55*b*.

In step S56*b*, if the specific acceleration situation is occurs (YES in S56*b*), the process proceeds to step S58*b*. On the other hand, if the specific acceleration situation does not occur (NO in S56*b*), the process proceeds to step S57*b*. Whether or not the specific acceleration situation occurs is determinable, for example, by the action determiner 102. In S57*b*, the same process as in S57 of the first embodiment may be performed. In S58*b*, the suppressor 100 temporarily sets the upper limit of acceleration to 0, and proceeds to step S6. After the lapse of a predetermined time that corresponds to a duration of temporary time, for example, the same process as in S57 may be performed.

Note that the configuration of the third embodiment may be combined with the configuration of the first embodiment. In such case, for example, when S56 of the first embodiment is NO, the process of S56*b* to S58*b* may be performed instead of the process of S57. Also, the configuration of the third embodiment may be combined with the configuration of the second embodiment.

Fourth Embodiment

The configuration of the fourth embodiment described in the following may also be applicable. Hereinafter, an example of the fourth embodiment is described with reference to the drawings.

The vehicle system 1 according to the fourth embodiment is the same as the vehicle system 1 according to the first embodiment, except that part of the LV 3 process in the suppressor 100 is different. The differences in the process are described below.

In the fourth embodiment, the suppressor 100 maintains, during congestion-limited automatic driving, the speed of the subject vehicle as the speed of the surrounding vehicle(s) having the same traveling direction, except for the preceding vehicle ahead of the subject vehicle, even when acceleration of the subject vehicle is required in the adjustment of vehicle speed of the subject vehicle by the vehicle speed adjuster 105 because the inter-vehicle distance to the preceding vehicle suddenly increases due to a lane change of the preceding vehicle to an adjacent lane (i.e., in the specific acceleration situation). The surrounding vehicle or vehicles referred to here are the vehicles on the left and right sides of the subject vehicle traveling in the same direction and the vehicles following the subject vehicle. For example, the targeted surrounding vehicle may be a vehicle on the left or right side of the subject vehicle traveling in the same direction. If there are a plurality of targeted surrounding vehicles, the suppressor 100 may maintain the speed of the subject vehicle at an average speed of those surrounding vehicles, for example. When there are a plurality of targeted surrounding vehicles, the suppressor 100 may maintain the speed of the subject vehicle at a lowest speed among the surrounding vehicles, for example. The targeted surrounding vehicle and the speed thereof may be identified, for example, by the travel environment recognizer 101. Hereinafter, maintaining the speed of the subject vehicle at a speed that matches the speed of surrounding vehicles having the same traveling direction as the subject vehicle, except for the vehicle ahead of the subject vehicle, is referred to as coordinated speed maintenance.

The speed of the surrounding vehicles in the same direction as the subject vehicle, except for the vehicle ahead of the subject vehicle, is likely to be low enough to match the flow of vehicles in traffic congestions during congestion-limited automatic driving, even in the specific acceleration situation. Therefore, according to the configuration of the fourth embodiment, even in case of the specific acceleration situation, the acceleration of the subject vehicle is suppressed to have a low travel speed thereof by performing the coordinated speed maintenance, avoiding the sudden braking of the subject vehicle even in a situation in which the immediately preceding vehicle ahead of the subject vehicle returns to the original lane after cancelling a lane change. Therefore, it is possible to suppress the uneasiness of the occupants while accelerating the vehicle by the automatic driving function.

Also, during congestion-limited automatic driving, the suppressor 100 preferably releases the coordinated speed maintenance after lapse of a preset time from completion of lane change of the vehicle immediately preceding the subject vehicle to the adjacent lane. The preset time may be set to any length of time that can be set. For example, the preset time may be a time equal to or longer than the time estimated as required for the preceding vehicle to complete the lane change. According to the above, when the preceding vehicle of the subject vehicle can complete the lane change, the coordinated speed maintenance is releasable and acceleration of the subject vehicle is performable.

Figure 7:
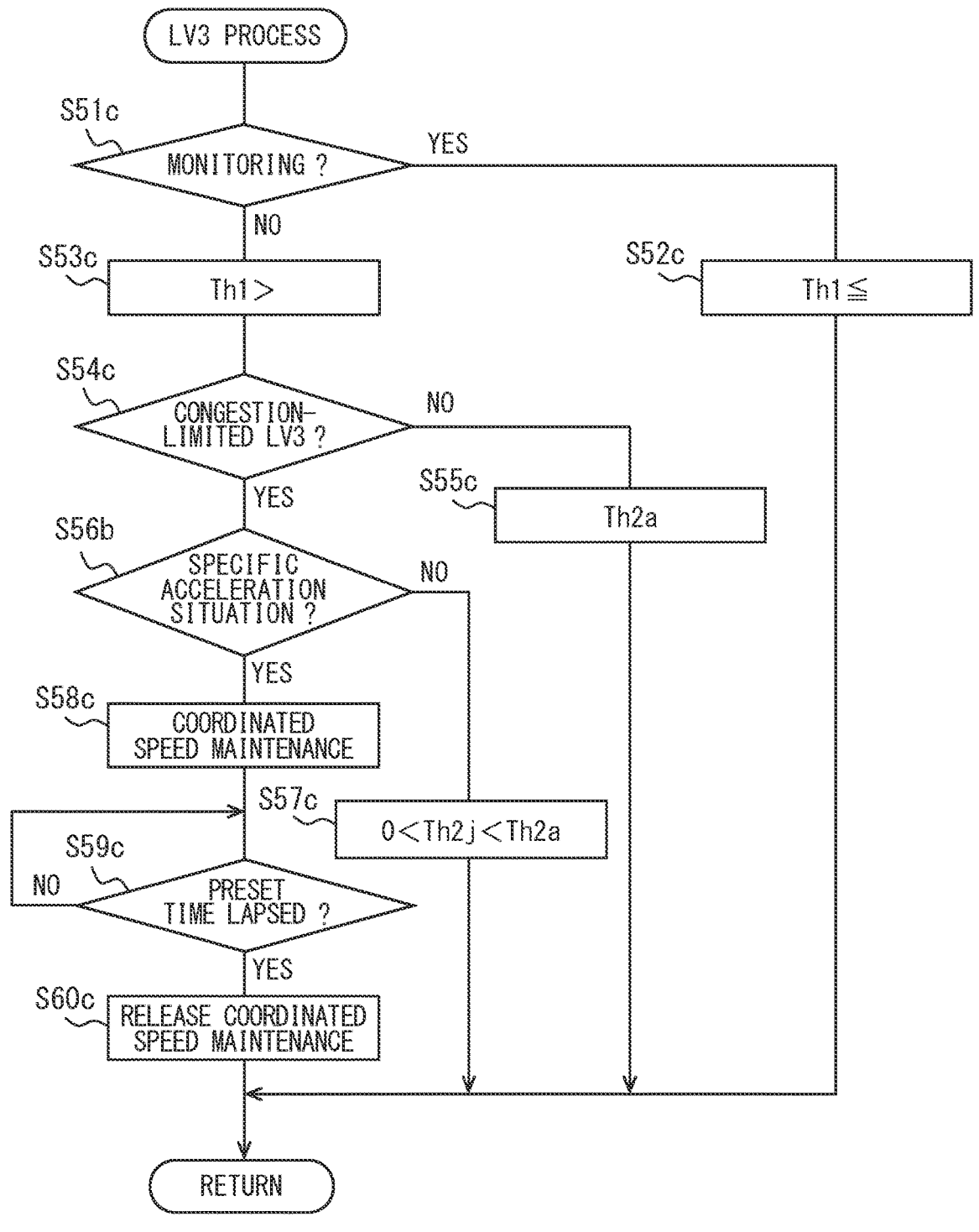
FIG. 7 is a flowchart showing an example of a flow of the LV3 process in the auto-drive ECU according to a fourth embodiment.

Here, an example of the flow of LV3 process in the auto-drive ECU 10 according to the fourth embodiment is described using a flowchart of FIG. 7. The process of S51*c* to S55*c* may be the same as the process of S51 to S55 of the first embodiment. In S54*c*, if the automation level of the subject vehicle identified by the level identifier 103 is congestion-limited LV3 (YES in S54*c*), the process proceeds to step S56*c*. On the other hand, if it is area-limited LV3 (NO in S54*c*), the process proceeds to step S55*c*.

In step S56*c*, if the specific acceleration situation occurs (YES in S56*c*), the process proceeds to step S58*c*. On the other hand, if the specific acceleration situation does not occur (NO in S56*c*), the process proceeds to step S57*c*. Whether or not the specific acceleration situation occurs is determinable, for example, by the action determiner 102. In S57*c*, the same process as S57 of the first embodiment may be performed. In S58*c*, the suppressor 100 performs coordinated speed maintenance, and proceeds to step S59*c*.

In step S59c, when the above-mentioned preset time has lapsed from the start of coordinated speed maintenance (YES in S59c), the process proceeds to step S60c. On the other hand, if the preset time has not lapsed from the start of the coordinated speed maintenance (NO in S59c), the process of step S59c is repeated. In step S60c, the suppressor 100 releases the coordinated speed maintenance, and the process proceeds to step S6. After releasing the coordinated speed maintenance, for example, the same process as S57 may be performed.

Note that the configuration of the fourth embodiment may be combined with the configuration of the first embodiment. In such case, for example, when S56 of the first embodiment is NO, the process of S56c to S60c may be performed instead of the process of S57. Also, the configuration of the fourth embodiment may be combined with the configuration of the second embodiment.

Fifth Embodiment

In the above-described embodiments, the auto-drive ECU 10 includes the traffic congestion determiner 106, the occupant state identifier 107, the travel road state identifier 111, and the trigger detector 112, but the configuration is not necessarily limited to the above. The functions of the traffic congestion determiner 106, the occupant state identifier 107, the travel road state identifier 111, and the trigger detector 112 may be performed by an ECU used in the vehicle other than the auto-drive ECU It should be noted that the present disclosure is not limited to the embodiments described above, and various modifications are possible within the scope indicated in the claims, and embodiments obtained by appropriately combining technical means in respectively different embodiments are also within the technical scope of the present disclosure. Further, the control unit and the method thereof described in the present disclosure may be realized by a dedicated computer including a processor programmed to perform one or more functions implemented as a computer program. Alternatively, the device and the method thereof described in the present disclosure may also be realized by a dedicated hardware logic circuit. Alternatively, the device and the method thereof described in the present disclosure may also be realized by one or more dedicated computers configured as a combination of a processor executing a computer program and one or more hardware logic circuits. Further, the computer program may also be stored in a computer-readable, non-transitory, tangible storage medium as instructions to be executed by a computer.

What is claimed is:

1. A vehicle control device usable for a vehicle, the vehicle configured to switch a level of automatic driving, the vehicle control device comprising:
 a vehicle speed adjuster configured to adjust a speed of the vehicle at a set vehicle speed; and
 a suppressor configured to change an upper limit of acceleration of the vehicle according to the level of automatic driving of the vehicle, when the vehicle speed adjuster requires acceleration of the vehicle to adjust the speed of the vehicle, wherein
 the vehicle is configured to
  switch, as the level of automatic driving, between an area-limited automatic driving without monitoring duty and a congestion-limited automatic driving without monitoring duty, and
  perform a following travel of the vehicle to follow a preceding vehicle immediately ahead of the vehicle, during the area-limited automatic driving and the congestion-limited automatic driving,
 the area-limited automatic driving is an automatic driving not imposing a duty of monitoring on a driver of the vehicle and permitted only in a limited area,
 the congestion-limited automatic driving is an automatic driving not imposing a duty of monitoring on the driver of the vehicle only during a congestion, and
 the suppressor is configured to, during the congestion-limited automatic driving, lower the upper limit of acceleration than the upper limit during the area-limited automatic driving, when the vehicle speed adjuster requires acceleration of the vehicle to adjust the speed of the vehicle, in response to sudden increase in an inter-vehicle distance to the preceding vehicle due to a lane change of the preceding vehicle to an adjacent lane.

2. The vehicle control device according to claim 1, wherein
 the vehicle is configured to switch, as the level of automatic driving, between an automatic driving without monitoring duty and an automatic driving with monitoring duty,
 the automatic driving without monitoring duty is an automatic driving not imposing a duty of monitoring on a driver of the vehicle,
 the automatic driving with monitoring duty is an automatic driving imposing a duty of monitoring on the driver of the vehicle, and
 the suppressor is configured to lower the upper limit of acceleration than the upper limit during the automatic driving with monitoring duty, when the vehicle speed adjuster requires acceleration of the vehicle to adjust the speed of the vehicle, during the automatic driving without monitoring duty.

3. The vehicle control device according to claim 2, wherein
 the vehicle control device further includes a monitoring-or-not identifier configured to identify whether or not the driver of the vehicle is monitoring surroundings, and
 the suppressor is configured to, when the vehicle speed adjuster requires acceleration of the vehicle to adjust the speed of the vehicle, during the automatic driving without monitoring duty,
 set the upper limit of acceleration of the vehicle to (i) a same value as the upper limit during the automatic driving with monitoring duty, or (ii) a value higher than the upper limit during the automatic driving with monitoring duty, when the monitoring-or-not identifier identifies that the driver of the vehicle is monitoring the surroundings.

4. The vehicle control device according to claim 2, further comprising:
 a trigger detector detecting a lane change trigger triggering a lane change of the vehicle, wherein
 the suppressor is configured to, when the vehicle speed adjuster requires acceleration of the vehicle to adjust the speed of the vehicle, during the automatic driving without monitoring duty,
 set the upper limit of acceleration of the vehicle to (i) a same value as the upper limit during the automatic driving with monitoring duty, or (ii) a value higher than the upper limit during the automatic driving with monitoring duty, when the trigger detector detects the lane change trigger.

5. The vehicle control device according to claim 1, further comprising:

a traffic congestion determiner configured to determine whether or not the congestion continues, wherein the suppressor is configured to, even when the vehicle speed adjuster requires acceleration of the vehicle to adjust the speed of the vehicle, in response to sudden increase in the inter-vehicle distance to the preceding vehicle due to a lane change of the preceding vehicle to an adjacent lane, during the congestion-limited automatic driving, maintain travel of the vehicle at a constant speed without acceleration, when the traffic congestion determiner determines that the congestion continues.

6. A vehicle control device usable for a vehicle, the vehicle configured to switch a level of automatic driving, the vehicle control device comprising:

a vehicle speed adjuster configured to adjust a speed of the vehicle at a set vehicle speed; and a suppressor configured to change an upper limit of acceleration of the vehicle according to the level of automatic driving of the vehicle, when the vehicle speed adjuster requires acceleration of the vehicle to adjust the speed of the vehicle, wherein the vehicle is configured to switch, as the level of automatic driving, between an area-limited automatic driving without monitoring duty and a congestion-limited automatic driving without monitoring duty, perform a following travel of the vehicle to follow a preceding vehicle immediately ahead of the vehicle during the area-limited automatic driving and the congestion-limited automatic driving, the area-limited automatic driving is an automatic driving not imposing a duty of monitoring on a driver of the vehicle and permitted only in a limited area, the congestion-limited automatic driving is an automatic driving not imposing a duty of monitoring on the driver of the vehicle only during a congestion, and the suppressor is configured to, when the vehicle speed adjuster requires acceleration of the vehicle to adjust the speed of the vehicle, in response to sudden increase in an inter-vehicle distance to the preceding vehicle due to a lane change of the preceding vehicle to an adjacent lane, during the area-limited automatic driving, increase the upper limit of acceleration than the upper limit during the congestion-limited automatic driving.

7. The vehicle control device according to claim 1, wherein the vehicle is configured to switch, as the level of automatic driving, to a congestion-limited automatic driving without monitoring duty, and perform a following travel of the vehicle to follow a preceding vehicle immediately ahead of the vehicle, during the congestion-limited automatic driving, the congestion-limited automatic driving is an automatic driving not imposing a duty of monitoring on a driver of the vehicle only during a congestion, and the suppressor is configured to, even when the vehicle speed adjuster requires acceleration of the vehicle to adjust the speed of the vehicle, in response to sudden increase in an inter-vehicle distance to the preceding vehicle due to a lane change of the preceding vehicle to an adjacent lane, during the congestion-limited automatic driving, temporarily stop acceleration of the vehicle.

8. A vehicle control device usable for a vehicle, the vehicle configured to switch a level of automatic driving, the vehicle control device comprising:

a vehicle speed adjuster configured to adjust a speed of the vehicle at a set vehicle speed; and a suppressor configured to change an upper limit of acceleration of the vehicle according to the level of automatic driving of the vehicle, when the vehicle speed adjuster requires acceleration of the vehicle to adjust the speed of the vehicle, wherein the vehicle is configured to switch, as the level of automatic driving, to a congestion-limited automatic driving without monitoring duty, and perform a following travel of the vehicle to follow a preceding vehicle immediately ahead of the vehicle, during the congestion-limited automatic driving, the congestion-limited automatic driving is an automatic driving not imposing a duty of monitoring on a driver of the vehicle only during a congestion, and the suppressor is configured to, even when the vehicle speed adjuster requires acceleration of the vehicle to adjust the speed of the vehicle, in response to sudden increase in an inter-vehicle distance to the preceding vehicle due to a lane change of the preceding vehicle to an adjacent lane, during the congestion-limited automatic driving, maintain the speed of the vehicle according to a speed of a surrounding vehicle in a same traveling direction, except for the preceding vehicle.

9. The vehicle control device according to claim 8, wherein the suppressor is configured to, during the congestion-limited automatic driving, release maintaining of the speed of the vehicle according to the speed of the surrounding vehicle, after lapse of a preset time from completion of the lane change of the preceding vehicle to the adjacent lane.

10. The vehicle control device according to claim 1, further comprising:

a state identifier configured to identify a state of a travel road of the vehicle and/or a state of an occupant of the vehicle, wherein the suppressor is configured to, when the vehicle speed adjuster requires acceleration of the vehicle to adjust the speed of the vehicle, change the upper limit of acceleration of the vehicle according not only to the level of automatic driving but also to the state identified by the state identifier.

11. The vehicle control device according to claim 10, wherein the state identifier is configured to identify at least the state of the travel road of the vehicle, and the suppressor is configured to, when the state of the travel road identified by the state identifier is a curved road, lower the upper limit of acceleration of the vehicle than the upper limit when the state of the travel road identified by the state identifier is a straight road.

12. The vehicle control device according to claim 10, wherein the state identifier is configured to identify at least a state of the occupant of the vehicle, and the suppressor is configured to, when the state of the occupant identified by the state identifier is a poor physical state or a state of concentrating on a work using vision other than monitoring surroundings, lower the upper limit of acceleration of the vehicle than the upper limit when the state of the occupant identified by the state identifier is other than the poor physical state and other than the state of concentrating.

13. The vehicle control device according to claim 1 further comprising:

a co-occupant presence identifier configured to identify presence or absence of a co-occupant, who is an occupant of the vehicle other than a driver, wherein the suppressor is configured to, when the vehicle speed adjuster requires acceleration of the vehicle to adjust the speed of the vehicle, change the upper limit of acceleration of the vehicle according not only to the level of automatic driving but also to the presence or absence of the co-occupant identified by the co-occupant presence identifier.

14. The vehicle control device according to claim 13, wherein the suppressor is configured to, when the co-occupant presence identifier identifies presence of the co-occupant, lower the upper limit of acceleration of the vehicle than the upper limit when the co-occupant presence identifier identifies absence of the co-occupant.

15. A vehicle control device usable for a vehicle, the vehicle configured to switch a level of automatic driving, the vehicle control device comprising:

a vehicle speed adjuster configured to adjust a speed of the vehicle at a set vehicle speed;

a suppressor configured to change an upper limit of acceleration of the vehicle according to the level of automatic driving of the vehicle, when the vehicle speed adjuster requires acceleration of the vehicle to adjust the speed of the vehicle;

a co-occupant presence identifier configured to identify presence or absence of a co-occupant, who is an occupant of the vehicle other than a driver; and a co-occupant type identifier configured to identify a type of the co-occupant in the vehicle, wherein the suppressor is configured to, when the vehicle speed adjuster requires acceleration of the vehicle to adjust the speed of the vehicle, change the upper limit of acceleration of the vehicle according not only to the level of automatic driving but also to the presence or absence of the co-occupant identified by the co-occupant presence identifier, and the suppressor is configured to, when the co-occupant presence identifier identifies presence of the co-occupant and when the co-occupant type identifier identifies the co-occupant as a person of protection target, lower the upper limit of acceleration of the vehicle than the upper limit when the co-occupant type identifier identifies the co-occupant not as the person of protection target.

16. A method for controlling a vehicle, the vehicle configured to switch a level of automatic driving, the method being executable by at least one processor, the method comprising:

adjusting, in a vehicle speed adjustment process, a speed of the vehicle at a set vehicle speed; and changing, in a suppression process, an upper limit of acceleration of the vehicle according to the level of automatic driving of the vehicle, when the vehicle speed adjustment process requires acceleration of the vehicle to adjust the speed of the vehicle, wherein the vehicle is configured to switch, as the level of automatic driving, between an area-limited automatic driving without monitoring duty and a congestion-limited automatic driving without monitoring duty, and perform a following travel of the vehicle to follow a preceding vehicle immediately ahead of the vehicle, during the area-limited automatic driving and the congestion-limited automatic driving, the area-limited automatic driving is an automatic driving not imposing a duty of monitoring on a driver of the vehicle and permitted only in a limited area, the congestion-limited automatic driving is an automatic driving not imposing a duty of monitoring on the driver of the vehicle only during a congestion, and the method further comprising:

lowering, during the congestion-limited automatic driving, the upper limit of acceleration than the upper limit during the area-limited automatic driving, when acceleration of the vehicle to adjust the speed of the vehicle is required, in response to sudden increase in an inter-vehicle distance to the preceding vehicle due to a lane change of the preceding vehicle to an adjacent lane.

17. A vehicle control device comprising:

at least one processor configured to adjust a speed of a vehicle at a set vehicle speed and change an upper limit of acceleration of the vehicle according to a level of automatic driving of a vehicle, in response to requirement of acceleration of the vehicle to adjust the speed of the vehicle, wherein the vehicle is configured to switch, as the level of automatic driving, between an area-limited automatic driving without monitoring duty and a congestion-limited automatic driving without monitoring duty, and perform a following travel of the vehicle to follow a preceding vehicle immediately ahead of the vehicle, during the area-limited automatic driving and the congestion-limited automatic driving, the area-limited automatic driving is an automatic driving not imposing a duty of monitoring on a driver of the vehicle and permitted only in a limited area, the congestion-limited automatic driving is an automatic driving not imposing a duty of monitoring on the driver of the vehicle only during a congestion, and the least one processor is further configured to, during the congestion-limited automatic driving, lower the upper limit of acceleration than the upper limit during the area-limited automatic driving, when the vehicle speed adjuster requires acceleration of the vehicle to adjust the speed of the vehicle, in response to sudden increase in an inter-vehicle distance to the preceding vehicle due to a lane change of the preceding vehicle to an adjacent lane.

* * * * *